US012698437B2

(12) United States Patent
Bae et al.

(10) Patent No.: US 12,698,437 B2
(45) Date of Patent: Aug. 4, 2026

(54) SOLVENTLESS QUANTUM DOT COMPOSITION, PREPARATION METHOD THEREFOR, AND CURED FILM, COLOR FILTER AND DISPLAY DEVICE WHICH COMPRISE SAME

(71) Applicant: Hansol Chemical Co., Ltd., Seoul (KR)

(72) Inventors: Yunju Bae, Sejong (KR); Gilran Kim, Suwon (KR); Ahyoung Jo, Jeonju (KR); Hyunjin Kang, Yongin (KR); Kyeonghun Gil, Jeonju (KR); Shulgi Park, Jeonju (KR); Eunhee Nam, Incheon (KR); Sungmin Ha, Jeonju (KR); Chunrae Nam, Jeonju (KR); Sunyoung Kwon, Jeonju (KR); Hye-Jin Paek, Yongin (KR); Keunchan Oh, Yongin (KR); Hyeokjin Lee, Yongin (KR)

(73) Assignees: Hansol Chemical Co., Ltd., Seoul (KR); Samsung Display Co., Ltd., Yongin (KR)

( * ) Notice: Subject to any disclaimer, the term of this patent is extended or adjusted under 35 U.S.C. 154(b) by 467 days.

(21) Appl. No.: 18/263,297

(22) PCT Filed: Jun. 3, 2021

(86) PCT No.: PCT/KR2021/006940

§ 371 (c)(1),
(2) Date: Jul. 27, 2023

(87) PCT Pub. No.: WO2022/163950

PCT Pub. Date: Aug. 4, 2022

(65) Prior Publication Data

US 2024/0101848 A1 Mar. 28, 2024

(30) Foreign Application Priority Data

Jan. 27, 2021 (KR) ........................ 10-2021-0011711

(51) Int. Cl.

*C09K 11/02* (2006.01)
*B82Y 20/00* (2011.01)
*B82Y 40/00* (2011.01)
*C09K 11/08* (2006.01)
*C09K 11/88* (2006.01)
*G02B 5/20* (2006.01)

(52) U.S. Cl.

CPC ........ *C09K 11/025* (2013.01); *C09K 11/0883* (2013.01); *C09K 11/883* (2013.01); *G02B 5/206* (2013.01); *B82Y 20/00* (2013.01); *B82Y 40/00* (2013.01)

(58) Field of Classification Search

CPC . C09K 11/025; C09K 11/0883; C09K 11/883; G02B 5/206

See application file for complete search history.

(56) References Cited

U.S. PATENT DOCUMENTS

| | | | | |
|---|---|---|---|---|
| 2011/0084250 | A1 | 4/2011 | Jang et al. | |
| 2018/0142149 | A1 | 5/2018 | Youn et al. | |
| 2019/0136126 | A1 | 5/2019 | Yang et al. | |
| 2020/0172802 | A1 | 6/2020 | Ahn et al. | |
| 2020/0231871 | A1 | 7/2020 | Kim et al. | |
| 2020/0248068 | A1 | 8/2020 | Choi et al. | |
| 2021/0024819 | A1 | 1/2021 | Kang et al. | |
| 2021/0108135 | A1* | 4/2021 | Kang .................. | C08K 5/5397 |

FOREIGN PATENT DOCUMENTS

| | | | |
|---|---|---|---|
| CN | 108624320 | A | 10/2018 |
| CN | 111320981 | A | 6/2020 |
| JP | 2018-084823 | A | 5/2018 |
| JP | 2019-085537 | A | 6/2019 |
| JP | 2019-085568 | A | 6/2019 |
| JP | 2019-112516 | A | 7/2019 |
| JP | 2020-015895 | A | 1/2020 |
| JP | 2020-118971 | A | 8/2020 |
| JP | 2020-126234 | A | 8/2020 |
| JP | 2021-021929 | A | 2/2021 |
| JP | 2021-063981 | A | 4/2021 |
| KR | 10-2019-0004536 | A | 1/2019 |
| KR | 10-2019-0050726 | A | 5/2019 |
| WO | 2019/030680 | A1 | 2/2019 |

* cited by examiner

*Primary Examiner* — C Melissa Koslow
(74) *Attorney, Agent, or Firm* — Young Basule Hanlon & MacFarlane, P.C.

(57) ABSTRACT

A quantum dot composition, a preparation method therefor, and a cured film, a color filter and a display device that comprise the same are described. Specifically, a solventless quantum dot composition comprises quantum dots, which are surface-treated with two types of ligands. As a result, the quantum dot composition exhibits low viscosity, excellent optical properties, and high storage stability.

20 Claims, No Drawings

SOLVENTLESS QUANTUM DOT COMPOSITION, PREPARATION METHOD THEREFOR, AND CURED FILM, COLOR FILTER AND DISPLAY DEVICE WHICH COMPRISE SAME

CROSS-REFERENCE TO RELATED APPLICATION

This application claims priority under 35 U.S.C. § 119 to Korean Patent Application No. 10-2021-0011711, filed on Jan. 27, 2021, the disclosure of which is incorporated by reference herein in its entirety.

TECHNICAL FIELD

The present disclosure relates to a solventless quantum dot composition, a preparation method therefor, and a cured film, a color filter, and a display device, each comprising the solventless quantum dot composition.

BACKGROUND

Quantum dots (QD), also known as semiconductor nanocrystals, can emit different wavelengths of light depending on particle size, even without changes in material type, enabling them to produce various colors. They have the advantage of higher color purity and light stability compared to conventional luminous bodies, which is why they are attracting attention as the next generation of light-emitting devices.

In particular, quantum dots, which have become a new trend in the field of display, can be applied not only to TVs and LEDs but also to various displays and electronic devices. Quantum dots represented by CdSe, InP, etc., have rapidly advanced in terms of quantum yield, with synthesis methods being introduced that approach 100% light-emission efficiency. On this basis, TVs applying quantum dot sheets are currently being commercialized. As the next step, quantum dot TVs are being developed that include quantum dots in the color filter layer of existing LED TVs (excluding pigments, dyes), moving from a filtering method to a self-luminous version. The focus of this quantum dot TV development is on how much light efficiency can be maintained during the process of making quantum dots form pixels and the manufacturing process.

Meanwhile, color filter materials require high sensitivity, adhesion to substrates, chemical resistance, and heat resistance. The color filters applied to conventional displays were typically formed using a patterning process that applies a photo-mask to a photosensitive resist composition, forms the desired pattern through a photo-exposure process, and then removes the non-exposed areas by dissolution through a development process.

SUMMARY

Recently, there has been interest in methods to curb the use of materials, aiming to alleviate the cost increase due to the advanced materials used in pixels, and using materials only in the desired areas rather than proceeding with patterning by conventional spin-coating or slit-coating. Inkjet method is one of the most representative ways, as it prevents the waste of unnecessary materials by using the materials only in the desired pixels.

However, the quantum dot compositions used in the inkjet method are required to have a viscosity of 100 cps or less, preferably 50 cps or less, so solvents were included to achieve low viscosity. By including a solvent in the quantum dot composition, there are limitations in thickening the film thickness after curing, and the deviation in thickness is severe. Moreover, the use of organic solvents raises concerns about environmental pollution.

There is therefore a need for the development of a quantum dot composition that is solventless with a low viscosity and exhibits excellent optical properties.

An aspect of the present disclosure is to provide a solventless quantum dot composition with low viscosity, excellent optical properties, and high storage stability.

Another aspect of the present disclosure is to provide a cured film, a color filter, and a display device that each include the solventless quantum dot composition.

In accordance with an aspect thereof, the present disclosure provides a solventless quantum dot composition including quantum dots and a photopolymerizable monomer, wherein the quantum dots are surface-modified with a first ligand represented by Chemical Formula 1 and a second ligand of 3 to 40 carbon atoms containing a carboxylic group.

Chemical Formula 1

$$M{-}[S{-}X]_n$$

In the above, M is a divalent to tetravalent metal, X is an organic group of 3 to 20 carbon atoms, and n is an integer of 2 to 4.

In another aspect thereof, the present disclosure provides a cured film, a color filter, and a display device, each including the solventless quantum dot composition.

The solventless quantum dot composition according to the present disclosure can exhibit excellent compatibility between the quantum dots and the monomer even without containing a solvent. In addition, with excellent optical properties and low viscosity, the solventless quantum dot composition according to the present disclosure can be used for inkjet printing.

Below, a detailed description will be given of the present disclosure.

DETAILED DESCRIPTION

Unless otherwise defined, all terms (including technical and scientific terms) used herein have the same meaning as commonly understood by one of ordinary skill in the art to which this invention belongs. Also, terms defined in commonly used dictionaries should not be interpreted in an idealized or overly formal sense unless expressly so defined herein.

The terms "comprises" and/or "comprising" as used herein specify the presence of stated elements, steps, operations, and/or components but do not preclude the presence or addition of one or more other elements, steps, operations, and/or components.

As used herein, the term "(meth)acrylate" means acrylate or methacrylate; "(meth)acrylic" means acrylic or methacrylic; "(meth)acryloyl" means acryloyl or methacryloyl.

As used herein, the term "monomer" is discriminated from an oligomer or a polymer and indicates a compound with a weight average molecular weight of 1,000 or less. In this description, "photopolymerizable monomer" refers to a monomer that can be polymerized through a photochemical reaction, as exemplified by a (meth)acrylate group.

The term "substituted" or "substitution" refers to the event wherein a hydrogen atom on a compound, a moiety, or a radical is replaced by a substituent such as an alkyl of C1 to C30, an alkenyl of C2 to C30, an alkynyl of C2 to C30, an alkoxy of C1 to C30, a heteroalkyl of C1 to C30, a heteroalkylaryl of C3 to C30, a cycloalkyl of C3 to C30, a cycloalkenyl of C3 to C15, a cycloalkynyl of C6 to C30, a heterocycloalkyl of C2 to C30, a halogen atom (—F, —Cl, —Br, or —I), a hydroxy (—OH), a nitro (—NO2), a cyano (—CN), an ester (—C(═O)OR) wherein R is a C1 to C10 alkyl or alkenyl), an ether (—O—R wherein R is a C1 to C10 alkyl or alkenyl), a carbonyl (—C(═O)—R, wherein R is a C1 to C10 alkyl or alkenyl), a carboxyl (—COOH), or a combination thereof.

As used herein, the term "organic group" means a linear or branched alkyl of C1 to C30, a linear or branched alkenyl of C2 to C30, or a linear or branched alkynyl of C2 to C30. In this regard, the alkyl, the alkenyl, and the alkynyl may each be substituted or unsubstituted.

As used herein, "alkyl" refers to a monovalent substituent derived from a saturated, linear, or branched hydrocarbon of 1 to 40 carbon atoms. Examples of such alkyl may include, but are not limited to, methyl, ethyl, propyl, isobutyl, sec-butyl, pentyl, iso-amyl, hexyl, and so on.

As used herein, "alkenyl" refers to a monovalent substituent derived from an unsaturated, linear, or branched hydrocarbon of 2 to 40 carbon atoms, with at least one carbon-carbon double bond present therein. Examples of such alkenyl may include, but are not limited to, vinyl, allyl, isopropenyl, 2-butenyl, etc.

Solventless Quantum Dot Composition

The quantum dot composition according to an embodiment of the present disclosure is a solvent-free type and has low viscosity and excellent optical properties even without a solvent, thus finding applications in inkjet printing.

In detail, the present disclosure provides a solventless quantum dot composition including quantum dots and a photopolymerizable monomer, wherein the quantum dots are surface-modified with a first ligand represented by Chemical Formula 1 and a second ligand of 3 to 40 carbon atoms containing a carboxylic group:

Chemical Formula 1

$$M \text{—}[S\text{—}X]_n$$

wherein:

M is a divalent to tetravalent metal,

X is an organic group of 3 to 20 carbon atoms, and n is an integer of 2 to 4.

Below, a detailed description will be given of the quantum dot composition.

Quantum Dot

Quantum dots (QDs) are nano-sized semiconductor materials that can have different energy band gaps depending on size and composition and can accordingly emit light of various emission wavelengths.

Such quantum dots may have a homogeneous single-layer structure; multilayer structures such as core-shell shapes, gradient structures; or a mixture of these structures. If the shell is multilayered, each layer may contain different components, for instance (quasi) metal oxides.

QDs may be freely selected from compounds of Groups II-VI, compounds of Groups III-V, compounds of Groups IV-VI, elements of Group IV, compounds of Group IV, and combinations thereof. If the quantum dot is a core-shell type, the core and shell can be freely composed of the components exemplified below.

Examples of the compounds of Groups II-VI include: a binary compound selected from the group consisting of CdO, CdS, CdSe, CdTe, ZnO, ZnS, ZnSe, ZnTe, HgS, HgSe, HgTe, MgSe, MgS, and a combination thereof, a ternary compound selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a combination thereof, and a quaternary compound selected from the group consisting of CdZnSeS, CdZnSeTe, CdZnSTe, CdHgSeS, CdHgSeTe, CdHgSTe, HgZnSeS, HgZnSeTe, HgZnSTe, and a combination thereof.

Examples of the compounds of Groups III-V include: a binary compound selected from the group consisting of GaN, GaP, GaAs, GaSb, AlN, AlP, AlAs, AlSb, InN, InP, InAs, InSb, and a combination thereof, a ternary compound selected from the group consisting of GaNP, GaNAs, GaNSb, GaPAs, GaPSb, AlNP, AlNAs, AlNSb, AlPAs, AlPSb, InNP, InNAs, InNSb, InPAs, InPSb, and a combination thereof, and a quaternary compound selected from the group consisting of GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a combination thereof.

Examples of the compounds of Groups IV-VI include: a binary compound selected from the group consisting of SnS, SnSe, SnTe, PbS, PbSe, PbTe, and a combination thereof, a ternary compound selected from the group consisting of SnSeS, SnSeTe, SnSTe, PbSeS, PbSeTe, PbSTe, SnPbS, SnPbSe, SnPbTe, and a combination thereof, and a quaternary compound selected from the group consisting of SnPbSSe, SnPbSeTe, SnPbSTe, and a combination thereof.

Examples of the elements of Group IV include Si, Ge, and a combination thereof. Examples of the compounds of Group IV include a binary compound selected from the group consisting of SiC, SiGe, and a combination thereof.

The aforementioned binary, ternary, or quaternary compounds may exist within particles at a uniform concentration, or they may be present within the same particles in a state where the concentration distribution is partially different. In addition, one quantum dot may have a core/shell structure surrounding another quantum dot. The interface between the core and the shell may have a concentration gradient in which the concentration of elements present in the shell decreases toward the center.

So long as it is typically used in the art, any shape may be imparted to the quantum dots without special limitations thereto. By way of example, the quantum dots may be in the form of spherical, rod-shaped, pyramid-shaped, disc-shaped, multi-arm, or cubic nanoparticles, nanotubes, nanowires, nanofibers, or nanoplate particles.

Furthermore, the size of the quantum dots is not particularly limited and can be appropriately adjusted within the conventional range known in the field. For instance, the quantum dots may have an average diameter (D50) of about 2 to 10 nm. When the diameter of the quantum dots is controlled within the range of about 2 to 10 nm, light of the desired color can be emitted. For example, given a diameter of about 5 to 6 nm, a quantum dot core/shell containing InP can emit light with a wavelength of about 520 to 550 nm. If the diameter of a quantum dot core/shell containing InP is about 7 to 8 nm, light of a wavelength of about 620 to 640 nm can be emitted. For example, non-cadmium (Cd) Group III-V QDs (e.g., InP, InGaP, InZnP, GaN, GaAs, GaP) may be used as blue-emitting QDs.

Also, the quantum dots may have a full width at half maximum (FWHM) of the emission wavelength spectrum of about 40 nm or less, and within this range, color purity or color reproduction can be improved. Moreover, the light emitted through these quantum dots is emitted in all directions, which can enhance the viewing angle of light.

According to an embodiment of the present disclosure, the content of the quantum dots may be 1 to 60% by weight and more preferably 20 to 50% by weight, based on the total weight of the solventless quantum dot composition.

Ligand

In the solventless quantum dot composition according to the present disclosure, the ligand plays a role in modifying the surface of the quantum dot. Due to the hydrophobic surface characteristics of quantum dots, there exists a barrier to the dispersion of photopolymerizable monomers, but the miscibility of quantum dots for photopolymerizable monomers can be improved by modifying the surface of the quantum dots with appropriate ligands.

According to an embodiment of the present disclosure, the ligand may include a first ligand represented by the following Chemical Formula 1; and a second ligand of 3 to 40 carbon atoms containing a carboxylic group:

Chemical Formula 1

$$M\text{—}[S\text{—}X]_n$$

wherein:

M is a divalent to tetravalent metal,

X is an organic group of 3 to 20 carbon atoms, and n is an integer of 2 to 4.

The first ligand may be a metal-thiol-based compound formed by reacting a metal salt and a thiol-based compound.

In the first ligand, M is a di- to tetravalent metal. For example, M is a metal of Groups 2 to 14 and may be Mg, Ca, Sc, Ti, V, Cr, Mn, Fe, Co, Ni, Cu, Zn, Ga, Ge, Sr, Y, Zr, Nb, Mo, Tc, Ru, Rh, Pd, Cd, In, or Sn. In Chemical Formula 1, n is determined depending on the number of valance electrons of M and is an integer of 2 to 4.

In addition, X in Chemical Formula 1 may be an organic group of 3 to 20 carbon atoms. By way of example, X may be an alkylene of 3 to 20 carbon atoms or alkenylene of 3 to 20 carbon atoms, and the alkylene and alkenylene may include at least one functional group selected from the group consisting of ester (—C(═O)O—), ether (—O—), carbonyl (—C(═O)—), carboxyl (—C(═O)—OH), sulfonyl (~SO2-), sulfide (—S—), sulfoxide (—SO—), alkoxy (—C(═O)—), and hydroxyl (—OH). In detail, X may be an organic group of 4 to 15 carbon atoms containing an ester group (—COO—).

With excellent affinity with the surface of the quantum dots, the thiol group in the first ligand can enhance the dispersibility of the quantum dot in photopolymerizable monomers. In addition, the first ligand not only contains the thiol group, but also bears ester, ether, carbonyl, carboxyl, alkoxy, cycloalkyl, or hydroxyl groups, which can maximize the dispersibility of the surface-modified quantum dots in polar monomers. Furthermore, the quantum dot composition that includes these quantum dots can possess characteristics beneficial for display processes (e.g., low viscosity). However, when using a thiol compound of 3 or less carbon atoms, it is possible to modify the surface of the quantum dots, but there may be a problem of difficulty in dispersion in general solvents and monomers due to the high polarity of the surface-modified quantum dots.

The second ligand may be an organic group of 3 to 40 carbon atoms containing a carboxyl group. In accordance with an embodiment of the present disclosure, the second ligand may not bear any thiol group.

According to an embodiment of the present disclosure, the second ligand may be represented by the following Chemical Formula 2:

Chemical Formula 2

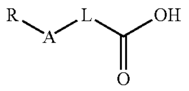

wherein:

L is a single bond or is selected from the group consisting of a substituted or unsubstituted alkylene of C1 to C20 and a substituted or unsubstituted alkenylene of C1 to C20, A is a single bond or an alkylene or alkenylene of C1 to C20 containing at least one functional group selected from the group consisting of ester (—C(═O)O—), ether (—O—), carbonyl (—C(═O)—), sulfonyl ($—SO_2—$), sulfide (—S—), and sulfoxide (—SO—), and R is a hydrogen atom or is selected from the group consisting of a substituted or unsubstituted alkyl of C1 to C20 or a substituted or unsubstituted alkenyl of C1 to C20.

In the second ligand, A may preferably bear ester (—COO—), ether (—CO—), or a combination thereof. In addition, A may be an alkylene or alkenylene of C2 to C15 and preferably an alkylene or alkenylene of C2 to C10.

Generally, thiol-based ligands are known to have high reactivity with quantum dot surfaces. However, quantum dot compositions containing only thiol-based ligands were not suitable for use in inkjet compositions due to issues such as the generation of harmful odors or increased viscosity leading to reduced storage stability. The quantum dot composition according to the present disclosure exhibits low viscosity and excellent storage stability by using the first ligand containing a thiol group and a second ligand not containing a thiol group. Moreover, the second ligand can exhibit excellent dispersibility in photopolymerizable monomers by including functional groups such as ester(~C(═O)O—), ether(—O—), carbonyl (—C(═O)—), and carboxyl (—C(═O)—OH). On the other hand, for a second ligand with 15 or more carbon atoms, there may be a problem in that the surface modification of the quantum dots is not achieved or the dispersibility in general solvents and monomers is inhibited.

According to an embodiment of the present disclosure, the first ligand and the second ligand may be mixed at a molar ratio of 1:0.1 to 20 and preferably at a molar ratio of 1:0.2-10, but with no limitations thereto.

Also, according to an embodiment of the present disclosure, the quantum dots and the ligand may be mixed at a weight ratio of 1:0.05 to 0.5 and preferably at a weight ratio of 1:0.1-0.5. In this regard, the ligand means the sum of the first ligand and the second ligand.

Photopolymerizable Monomer

In the quantum dot composition according to the present disclosure, the photopolymerizable monomer is responsible for controlling the overall crosslinking density of the polymer matrix, that is, the formulation where the quantum dots (QDs) are dispersed, thereby expressing the structure and physical properties of the polymer matrix. The photopolymerizable monomer may contribute to an improvement in flexibility and adhesion to other materials.

The photopolymerizable monomer may include (meth) acrylate-based monomers.

So long as it is typically used in the art, any monomer is available with no limitations thereto.

For example, the (meth)acrylate-based monomer may bear at least one of a (meth)acryl group, a vinyl group, and an allyl group. Concrete examples include 1,6-hexanediol diacrylate, 1,6-cyclohexanediol diacrylate, 2,2-dimethyl-1,3-propanediol diacrylate, diethylene glycol diacrylate, dipropylene glycol diacrylate, 1,3-butylene glycol dimethacrylate, trimethylolpropane trimethacrylate, isobonyl acrylate, isobonyl methacrylate, tetrahydrofuryl acrylate, acryloyl morpholine, 2-phenoxyethyl acrylate, tripropyleneglycol diacrylate, trimethylolpropane triacrylate, pentaerythritol mono(meth)acrylate, pentaerythritol di(meth)acrylate, pentaerythritol triacrylate, pentaerythritol trimethacrylate, dipentaerytritol hexaacrylate, and dipentaerythritol hexamethacrylate. These may be used alone or in any combination.

In the present disclosure, the (meth)acrylamide-based monomer may be contained in an amount of 25 to 70% by weight and preferably in an amount of 35 to 60% by weight, based on the total weight of the solventless quantum dot composition.

Photoinitiator

In the solventless quantum dot composition according to the present disclosure the photoinitiator is a component that initiates photopolymerization when exposed to a light source such as ultraviolet (UV) light. So long as it is typically known in the art, any photopolymerization photoinitiator may be employed without limitations. For examples, acetophenone-based compounds, benzophenone-based compounds, thioxanthone-based compounds, benzoin-based compounds, triazine-based compounds, oxime-based compounds, etc. may be employed.

Non-limiting examples of available photoinitiators include ethyl (2,4,6-trimethylbenzoyl)phenylphosphinate, Irgacure 184, Irgacure 369, Irgacure 651, Irgacure 819, Irgacure 907, benzionalkylether, benzophenone, benzyl dimethyl ketal, hydroxycyclohexylphenylacetone, chloroacetophenone, 1,1-dichloroacetophenone, diethoxy acetophenone, hydroxy acetophenone, 2-chorothioxanthone, 2-ETAQ (2-ethylanthraquinone, 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, and methylbenzoylformate. These photoinitiators may be used alone or in combinations thereof.

The content of the photoinitiator can be appropriately adjusted within a range known in the art. For example, the photoinitiator may be used in an amount of 0.01 to 10% by weight and preferably in an amount of 0.1 to 5% by weight, based on the total weight of the solventless quantum dot composition. When the content of the photoinitiator falls within the scope set forth above, the photopolymerization can be sufficiently achieved without lowering the physical properties of the matrix.

Diffuser

In the solventless quantum dot composition according to the present disclosure, a diffuser functions to reflect light not absorbed in the photo-conversion material and help the photo-conversion material re-absorb the reflected light. In other words, the diffuser can increase the amount of light absorbed in the photo-conversion material and thus photo conversion efficiency of the photosensitive resin composition.

So long as it is known in the art, any diffuser may be used without limitations. Such a diffuser may be in the form of a solid diffuser or a diffuser dispersion. The dispersing medium in which the diffuser is dispersed may be an organic solvent such as PGMEA.

Non-limiting examples of available diffusers include barium sulfate ($BaSO_4$), calcium carbonate ($CaCO_3$), titanium dioxide ($TiO_2$), zirconia ($ZrO_2$), and combinations thereof. Furthermore, the average diameter or shape of the diffuser is not particularly limited and can be appropriately selected within ranges known in the field. For instance, the diffuser may have an average diameter ($D_{50}$) of 150 nm to 250 nm and specifically 180 nm to 230 nm. Given an average diameter within the range, the diffuser can have a superb light diffusion effect and enhance photoconversion efficiency.

The content of the diffuser can be appropriately adjusted within the range known in the field. For example, the diffuser may be used in an amount of 0.01 to 10% by weight and preferably in an amount of 0.1 to 5% by weight, based on the total weight of the solventless quantum dot composition. If the content of the diffuser falls within the scope set forth above, an improvement can be brought about in photoconversion efficiency without deteriorating the physical properties of the matrix.

Polymerization Inhibitor

In the solventless quantum dot composition according to the present disclosure, a polymerization inhibitor is a substance that can react with radicals to form radicals or compounds of low reactivity that cannot induce polymerization reactions, thereby regulating the photopolymerization reaction rate.

Any polymerization inhibitor may be used without limitations as long as it is known in the art. For example, quinone-based compounds, phenolic or aniline-based compounds, aromatic nitro, and nitroso compounds may be available as polymerization inhibitors. Concrete examples of the polymerization inhibitor include hydroquinone (HQ), methyl hydroquinone (THQ), hydroquinone monomethyl ether (MEHQ) and hydroquinone monoethyl ether (EEHQ), 1,4-benzoquinone (BQ), 2,5-diphenyl benzoquinone (DPBQ), methyl-1,4-benzoquinone (MBQ), phenyl-1,4-benzoquinone (PBQ); 2,6-di-tert-butyl-4-methylphenol (BHT), 2,6-diphenyl-4-octadecyloxyphenol, catechol; phenothiazine, bis(α-methylbenzyl)phenothiazine, 3,7-dioctylphenothiazine, bis(α, α-dimethylbenzyl)phenothiazine; dimethyldithiocarbamic acid, diethyldithiocarbamic acid, dipropyldithiocarbamic acid, dibutyldithiocarbamic acid, and diphenyldithiocarbamic acid. These compounds may be used alone or in combination thereof.

The content of the polymerization inhibitor can be appropriately adjusted into a range known in the art. For instance, the polymerization inhibitor may be used in an amount of 0.01 to 2% by weight and preferably in an amount of 0.05 to 1% by weight, based on the total weight of the solventless quantum dot composition.

Stabilizer

In the solventless quantum dot composition according to the present disclosure, a stabilizer may be used to improve stability and dispersibility of quantum dots. The stabilizer, when substituted on the surface of the quantum dot shell, can enhance the dispersive stability of the quantum dots in the solvent, thereby stabilizing the quantum dots.

Any substance that can enhance the stability and dispersibility of quantum dots in the field can be used as a stabilizer without limitations. For example, thiol-based stabilizers can be used. The thiol-based stabilizers can improve the dispersibility of the quantum dot in the photopolymerizable monomer. Additionally, the thiol groups present in the thiol-based stabilizers can form covalent bonds by reacting with the acrylic groups of the photopolymerizable monomer, thereby improving the heat resistance of the quantum dot composition.

The thiol-based stabilizers may have at least seven carbon atoms and may bear 2 to 10, or specifically 2 to 6 thiol groups (—SH) at the terminal depending on their structure, but with no limitations thereto. Non-limiting examples of available thiol-based stabilizers include pentaerythritol tetrakis(3-mercaptopropionate), trimethylolpropane tris(3-mercaptopropionate), pentaerythritol tetrakis(mercaptoacetate), trimethylolpropane tris(2-mercaptoacetate), glycol di-3-mercaptopropionate, and any combination thereof.

Other Additives

In addition to the components mentioned above, the quantum dot composition of the present disclosure can use any additives known in the art without limitations as long as they do not inhibit the advantages of the disclosure. The content of these additives can be appropriately adjusted within the range known in the art.

Examples of available additives include silane compounds, siloxane compounds, antioxidants, polymerization inhibitors, lubricants, surface modifiers, surfactants, adhesion promoters, anti-foaming agents, slip agents, solvents, wetting agents, photostabilizers, stain preventers, plasticizers, thickeners, polymers, etc. These can be used alone or in combinations.

A silane compound functions to provide adhesiveness to the matrix while a siloxane compound accounts for the provision of wetting properties. Any silane and siloxane compounds that are known in the art can be used without limitations.

Antioxidants prevent fading due to heat or light exposure and from various oxidative gases such as ozone, active oxygen, NOx, SOx (x is an integer). In the present disclosure, an antioxidant may be added to reduce the discoloration of the matrix and the decrease in film thickness due to decomposition. Examples of antioxidants include hydrazides, hindered amine antioxidants, nitrogen-containing heterocyclic mercapto compounds, thioether antioxidants, hindered phenol antioxidants, ascorbates, zinc sulfate, thiocyanates, thiourea derivatives, sugars, azides, sulfites, thiosulfates, hydroxylamine derivatives, etc.

With the aim of increasing the adhesion within the quantum dot composition, a leveling agent can be contained to provide leveling and thus to allow the quantum dot composition to be coated smoothly and evenly when applied. As a leveling agent, an acrylic-based and a silicone-based compound may be used alone or in combinations of two or more. For example, polyether-modified polydimethylsiloxane, and acryloyl groups grafted polyether chain may be used.

A surfactant may be included to improve the mixing and coating uniformity of the quantum dot composition. As a surfactant, any cationic, anionic, zwitterionic, and nonionic surfactant known in the field may be employed. For example, one or more of fluorosurfactants, silicone surfactants, and fluorosilicone surfactants can be used.

A light stabilizer act as a UV absorber, enhancing the weather resistance of the matrix.

Functioning to mitigate crack formation in the dried polymer matrix, a plasticizer may be used to prevent the cured matrix from cracking and improve impact resistance and flexibility therein.

The solventless quantum dot composition according to the present disclosure includes quantum dots surface-modified with two types of ligands and a photopolymerizable monomer having excellent compatibility with the ligand-substituted quantum dots.

The solventless quantum dot composition according to the present disclosure has excellent optical properties such as light absorption rate, photoconversion efficiency, etc., and can achieve a low viscosity. Specifically, the viscosity at room temperature (25° C.) can be 30 cps or less, preferably 28 cps or less, more preferably 25 cps or less. Adjustment of the viscosity within an appropriate range can provide excellent workability and processability and storage stability at high temperatures for the solventless quantum dot composition. Also, being capable of achieving a low viscosity, the solventless quantum dot composition according to the present disclosure can be used for inkjet printing.

Method for Preparing Solventless Quantum Dot Composition

In accordance with an aspect of the present disclosure, the quantum dot composition may be prepared by a method including the steps of: (a) surface modifying quantum dots with a first ligand represented by the following Chemical Formula 1 and a second ligand of 3 to 40 carbon atoms containing a carboxyl group; (b) centrifuging the reaction mixture of step (a) to obtain the surface-modified quantum dots; and (c) dispersing the surface-modified quantum dots in the photopolymerizable monomers.

Chemical Formula 1

$$M\text{—}[S\text{—}X]_n$$

In the above:

M is a divalent to tetravalent metal,

X is an organic group of 3 to 20 carbon atoms, and n is an integer of 2 to 4.

Here, the quantum dots, the first ligand, the second ligand, and the photopolymerizable monomers are as described above.

In addition, step (a) may include either (a-1) introducing a first ligand into the quantum dot dispersion and reacting to modify the surface of the quantum dots, followed by introducing a second ligand and reacting to further modify the surface of the quantum dots, or (a-2) simultaneously introducing the first ligand and the second ligand and reacting to modify the surface of the quantum dots.

Specifically, step (a-1) may be a step in which the surface of the quantum dots is modified by introducing the first ligand into the quantum dots, reacting same for 30 minutes to 3 hours at a temperature of 25 to 170° C., cooling the reaction temperature to 25 to 70° C., and then introducing and reacting the second ligand for 30 minutes to 3 hours.

In step (a-1), the surface modification of quantum dots is conducted in a two-step mode to prevent the formation of byproducts due to the reaction between the first ligand and the second ligand, with the consequence optimization of ligand exchange on the quantum dots' surface.

When both the first ligand and the second ligand are simultaneously introduced to the quantum dots, the thiol-ene reaction between the thiol group of the first ligand and the acrylate group of the second ligand may lead to the formation of byproducts. These byproducts may increase the viscosity of the quantum dot composition when dispersing surface-modified quantum dots into photopolymerizable monomers.

Furthermore, in step (a-1), the conversion rate of surface modification can be increased by modifying the surface of the quantum dots with the first ligand at a high temperature of 130 to 170° C. As the reaction temperature increases, the rate of modification on the quantum dot surface speeds up, thereby allowing the quantum dot surface to be evenly modified. However, the reaction temperature may not be limited by the ligand material, reaction time, or stirring speed.

Also, step (a-2) may be a step in which the surface of the quantum dots is modified by simultaneously adding the first and second ligands to the quantum dots and reacting for 30 minutes to 3 hours at 25 to 100° C.

After surface modification through the method described above, the surface-modified quantum dots can be obtained by centrifugation. In addition, the solventless quantum dot composition can be prepared by dispersing the obtained surface-modified quantum dots in the polymerizable monomers.

Cured Film, Color Filter, and Display Device

The present disclosure can provide a cured film including the aforementioned solventless quantum dot composition. The cured film according to the present disclosure can have excellent optical properties, specifically, an optical absorption rate of 75% or more, preferably 78% or more. Also, the cured film can have an optical conversion rate of 25% or more, specifically 29% or more.

The cured film can be manufactured by a method including the steps of forming a pattern by inkjet spray-coating the solventless quantum dot composition onto a substrate and curing the pattern.

The present invention provides a color filter that includes the solventless quantum dot composition. A color filter is an optical component in a thin film form, which extracts three colors (i.e., red, green, and blue) on a pixel basis from white light emitted from a backlight source, allowing color realization in a liquid crystal display.

Such a color filter can be manufactured by various methods such as dyeing, pigment dispersion, printing, and electrodeposition. Also, a color filter containing a quantum dot composition can be manufactured by an inkjet method. The inkjet method prevents unnecessary waste of material because it uses material only for the desired pixels.

Furthermore, the present disclosure provides a display device that includes the quantum dot composition. In this regard, the display device includes a liquid crystal display (LCD), an electroluminescent display (EL), a plasma display (PDP), a field emission display (FED), or an organic light-emitting diode (OLED), but the display device is not limited thereto.

A better understanding of the present disclosure may be obtained via the following Examples that are set forth to illustrate but are not to be construed to limit the present disclosure.

Preparation Example 1-1: Preparation of First Ligand 1-1

In a round-bottom flask, zinc chloride ($ZnCl_2$, 13.6 g) and the compound represented by chemical formula A-1 (57.7 g) were dissolved together by thermal stirring at 60° C. in cyclohexyl acetate (285 g). Then, HCl was removed for 2 hours in a vacuum to afford a first ligand 1-1.

A-1

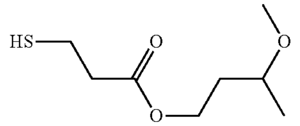

Preparation Example 1-2: Preparation of First Ligand 1-2

First ligand 1-2 was prepared in the same manner as in Preparation Example 1-1 with the exception of using the compound represented by chemical formula A-2 (53.4 g) instead of the compound represented by chemical formula A-1.

A-2

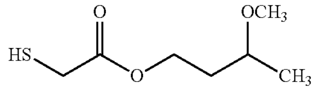

Preparation Example 1-3: Preparation of First Ligand 1-3

First ligand 1-3 was prepared in the same manner as in Preparation Example 1-1 with the exception of using the compound represented by chemical formula A-3 (61.2 g) instead of the compound represented by chemical formula A-1.

A-3

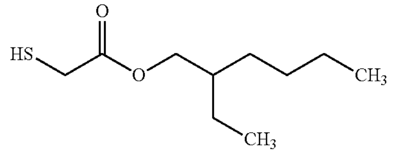

Preparation Example 1-4: Preparation of First Ligand 1-4

First ligand 1-4 was prepared in the same manner as in Preparation Example 1-1 with the exception of using the compound represented by chemical formula A-4 (48.6 g) instead of the compound represented by chemical formula A-1.

A-4

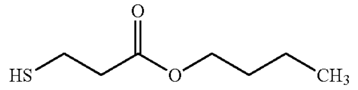

Preparation Example 1-5: Preparation of First Ligand 1-5

First ligand 1-5 was prepared in the same manner as in Preparation Example 1-1 with the exception of using the compound represented by chemical formula A-5 (44.4 g) instead of the compound represented by chemical formula A-1.

A-5

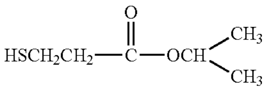

Preparation Example 2-1: Preparation of Second Ligand 2-1

In a round-bottom flask, the compound represented by chemical formula B-1 (20 g) and cyclohexyl acetate (80 g) were stirred together at room temperature for 1 hour to afford second ligand 2-1.

B-1

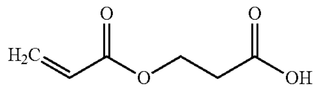

Preparation Example 2-2: Preparation of Second Ligand 2-2

Second ligand 2-2 was prepared in the same manner as in Preparation Example 2-1 with the exception of using the compound represented by chemical formula B-2 instead of the compound represented by chemical formula B-1.

B-2

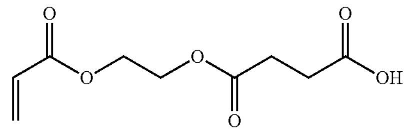

Preparation Example 2-3: Preparation of Second Ligand 2-3

Second ligand 2-3 was prepared in the same manner as in Preparation Example 2-1 with the exception of using the compound represented by chemical formula B-3 instead of the compound represented by chemical formula B-1.

B-3

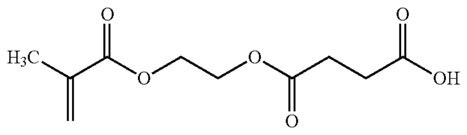

Preparation Example 2-4: Preparation of Second Ligand 2-4

Second ligand 2-4 was prepared in the same manner as in Preparation Example 2-1 with the exception of using the compound represented by chemical formula B-4 instead of the compound represented by chemical formula B-1.

B-4

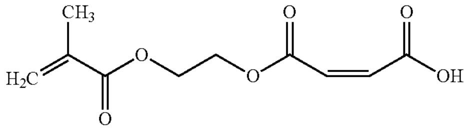

Preparation Example 2-5: Preparation of Second Ligand 2-5

Second ligand 2-5 was prepared in the same manner as in Preparation Example 2-1 with the exception of using the compound represented by chemical formula B-5 instead of the compound represented by chemical formula B-1.

B-5

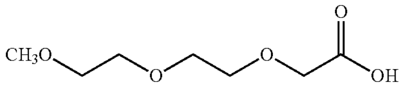

Preparation Example 2-6: Preparation of Second Ligand 2-6

Second ligand 2-6 was prepared in the same manner as in Preparation Example 2-1 with the exception of using the compound represented by chemical formula B-6 instead of the compound represented by chemical formula B-1.

B-6

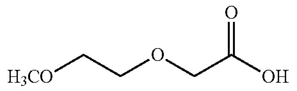

Preparation Example 3: Preparation of Ligand 3

In a round-bottom flask, the compound represented by chemical formula A-1 (57 g) and cyclohexyl acetate (228 g) were stirred together to afford ligand 3.

A-1

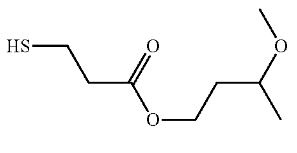

Example 1: Preparation of Quantum Dot Composition 1-1. Surface Modification of Quantum Dot A InP/ZnSe/ZnS quantum dot dispersion (100 g) (Hansol, SHQD-533; quantum dot solid content 20%; in cyclohexyl acetate) was heated to 140° C. in a nitrogen atmosphere while being stirred. The ligand (12 g) according to Preparation Example 1-1 was introduced, stirred at 140° C. for 1.5 hours, and then cooled to 60° C. Thereafter, the ligand (30 g) according to Preparation Example 2-1 was fed and reacted at 60° C. for 1.5 hours to produce surface-modified quantum dots. After completion of the reaction, chemical precipitation was made using a centrifuge. The supernatant was discarded, and the remaining quantum pellet was sufficiently dried overnight in a vacuum oven to obtain surface-modified quantum dots.

1-2. Preparation of Quantum Dot Composition

Afterward, the surface-modified quantum dots were dispersed in 1,6-hexanediol diacrylate monomers to give quantum dot-dispersed monomers with a quantum dot solid content of 50 wt %.

With the prepared quantum dot-dispersed monomers (QD 50 wt %), 1,6-hexanediol diacrylate monomers, ethyl(2,4,6-trimethylbenzoyl)phenylphosphinate as a photoinitiator, titanium dioxide ($TiO_2$, average diameter 200 nm) as a diffuser, and hydroquinone monomethyl ether as a polymerization inhibitor were additionally mixed at the contents listed in Table 2, below, to prepare a quantum dot composition. In Table 2, the content of each component is expressed as % by weight.

Examples 2 to 10: Preparation of Quantum Dot Compositions

Quantum dot compositions of Examples 2 to 10 were prepared in the same manner as in Example 1 with the exception of using the ligands given in Table 1, below, instead of the ligands of Preparation Examples 1-1 and 2-1.

Comparative Example 1: Preparation of Quantum Dot Composition 1-1. Surface Modification of Quantum Dot A InP/ZnSe/ZnS quantum dot dispersion (100 g) (Hansol, SHQD-533; quantum dot solid content 20%; in cyclohexyl acetate) was heated to 140° C. in a nitrogen atmosphere while being stirred. The ligand (12 g) according to Preparation Example 1-1 was introduced and reacted at 140° C. for 1 hour to produce surface-modified quantum dots. After completion of the reaction, the reaction mixture was cooled to 60° C. and centrifuged to conduct chemical precipitation. The supernatant was discarded, and the remaining quantum pellet was sufficiently dried overnight in a vacuum oven to obtain surface-modified quantum dots.

1-2. Preparation of Quantum Dot Composition

A quantum dot composition was prepared in the same manner as in Example 1-2 with the exception of using the surface-modified quantum dots of Comparative Example 1-2

Comparative Example 2: Preparation of Quantum Dot Composition 2-1. Surface Modification of Quantum Dot A InP/ZnSe/ZnS quantum dot dispersion (100 g) (Hansol, SHQD-533; quantum dot solid content 20%; in cyclohexyl acetate) was heated to 60° C. in a nitrogen atmosphere while being stirred. The ligand (30 g) according to Preparation Example 2-1 was introduced and reacted at 60° C. for 4 hours to produce surface-modified quantum dots. After completion of the reaction, chemical precipitation was conducted using a centrifuge. The supernatant was discarded, and the remaining quantum pellet was sufficiently dried overnight in a vacuum oven to obtain surface-modified quantum dots.

2-2. Preparation of Quantum Dot Composition

A quantum dot composition was prepared in the same manner as in Example 1-2 with the exception of using the surface-modified quantum dots of Comparative Example 2-1.

Comparative Example 3: Preparation of Quantum Dot Composition

A quantum dot composition was prepared in the same manner as in Comparative Example 2 with the exception of using the ligand according to Preparation Example 3 instead of the ligand according to Preparation Example 2-1.

TABLE 1

| | $1^{st}$ Ligand (weight) | $2^{nd}$ Ligand (weight) |
|---|---|---|
| Ex. 1 | Ligand 1-1(12 g) | Ligand 2-1(30 g) |
| Ex. 2 | Ligand 1-2(12 g) | Ligand 2-1(30 g) |
| Ex. 3 | Ligand 1-3(12 g) | Ligand 2-1(30 g) |
| Ex. 4 | Ligand 1-4(12 g) | Ligand 2-1(30 g) |
| Ex. 5 | Ligand 1-5(12 g) | Ligand 2-1(30 g) |
| Ex. 6 | Ligand 1-1(12 g) | Ligand 2-2(30 g) |
| Ex. 7 | Ligand 1-1(12 g) | Ligand 2-3(30 g) |
| Ex. 8 | Ligand 1-1(12 g) | Ligand 2-4(30 g) |
| Ex. 9 | Ligand 1-1(12 g) | Ligand 2-5(30 g) |
| Ex. 10 | Ligand 1-1(12 g) | Ligand 2-6(30 g) |
| C. Ex. 1 | Ligand 1-1(40 g) | — |
| C. Ex. 2 | — | Ligand 2-1(30 g) |
| C. Ex. 3 | Ligand 3(40 g) | — |

TABLE 2

| | Content (% by weight) |
|---|---|
| Surface-modified quantum dot | 40 |
| Photopolymerizable monomer | 54.4 |
| Photoinitiator | 1.5 |
| Diffuser | 4 |
| Polymerization inhibitor | 0.1 |

Evaluation Example 1: Evaluation for Photoconversion Efficiency and Light Absorptivity The quantum dot compositions of Examples 1 to 10 and Comparative Examples 1 and 2 were each spin-coated to a thickness of 10 m on a glass substrate, using a spin coater (Opticoat MS-A50, Mikasa Co., Ltd.), and then exposed to the light at 4000 mJ (83° C., 4 seconds) from a 395 nm UV exposure equipment to prepare cured films. Subsequently, 2 cm×2 cm single film specimens were each loaded in an integrating sphere equipment (QE-2100, Otsuka Electronics, Co., Ltd.) to measure an initial light absorptivity and photoconversion efficiency. The loaded single film specimens were post-baked at 180° C. for 30 minutes under a nitrogen atmosphere in a drying furnace before measuring light absorptivity and photoconversion efficiency. The measurements are summarized in Table 3, below.

The photoconversion efficiency was measured with an Otsuka's integrating hemisphere film-type measurement device. After loading the quantum dot composition-coated film, 450 nm blue light was applied to the film, and all the green light emitted omnidirectionally upwards was absorbed and calculated as an integral value. The photoconversion efficiency (Green/Blue) was measured by the increase in the green conversion peak compared to the decrease in the blue absorption peak.

TABLE 3

| | Photoconversion efficiency (%) | Light absorptivity (%) |
|---|---|---|
| Ex. 1 | 81.3 | 33.8 |
| Ex. 2 | 80.2 | 33.4 |
| Ex. 3 | 80.6 | 33.4 |
| Ex. 4 | 81.3 | 33.6 |
| Ex. 5 | 80.7 | 33.4 |
| Ex. 6 | 80 | 33.1 |
| Ex. 7 | 80 | 33.2 |
| Ex. 8 | 80.5 | 29.2 |
| Ex. 9 | 86 | 31.4 |
| Ex. 10 | 87.3 | 32.7 |
| C. Ex. 1 | 85.4 | 30.9 |
| C. Ex. 2 | 82.6 | 28 |

As shown in Table 3, the cured films containing the solventless quantum dot compositions according to Examples 1 to 10 were observed to exhibit excellent optical properties with a light absorptivity of 80% or greater and a photoconversion efficiency of 29.2% or greater. On the other hand, it was impossible to measure the optical properties of the quantum dot composition according to Comparative Example 3, as the quantum dots were not dispersed in the photo-polymerizable monomer.

Evaluation Example 2: Evaluation for Viscosity and Stability of Solventless Quantum Dot Compositions To evaluate the storage stability of the solventless quantum dot compositions prepared according to Example 1 and Comparative Examples 1 to 2, the solvent-free quantum dots were stored at 40° C. and the change in viscosity over 4 weeks was measured at room temperature (25° C.) for 2 minutes at 100 rpm using a viscometer (RheoStress MARS-40, HAAKE). The measurements are summarized in Table 4 below.

TABLE 4

| | Viscosity (cps) | | | | |
|---|---|---|---|---|---|
| | Initial | Week 1 | Week 2 | Week 3 | Week 4 |
| Ex. 1 | 23 | 23.3 | 23.9 | 24.6 | 24.6 |
| C. Ex. 1 | 30 | 39 | 43.8 | 48.7 | 53.5 |
| C. Ex. 2 | 38 | 40.7 | 43.5 | 46.2 | 49 |

As shown in Table 4, the initial viscosity of the solventless quantum dot compositions according to Comparative Examples 1 and 2 were respectively 30 cps and 38 cps. By contrast, the initial viscosity of the solventless quantum dot composition according to Example 1 was 23 cps, and even after storage for 4 weeks, it was found to have excellent storage stability as the viscosity was less than 25 cps.

Evaluation Example 3: Ink-Jetting Evaluation

The ink-jetting properties of the solventless quantum dot compositions prepared according to Example 1 and Comparative Examples 1 to 2 were evaluated using the Omnijet300 equipment (Unijet Inc.). During this time, the jetting properties were checked while maintaining the temperature of the Dimetix DMC head at 40° C.

As a result, the solventless quantum dot composition according to Example 1 exhibited excellent ink-jetting properties, while the solvent-free quantum dots according to Comparative Examples 1 to 2 were found to be impossible for inkjetting due to their high viscosity.

The invention claimed is:

1. A solventless quantum dot composition, comprising:

a quantum dot; and a photopolymerizable monomer, the quantum dot being surface-modified with a first ligand represented by Chemical Formula 1 and a second ligand of 3 to 40 carbon atoms containing a carboxylic group, wherein:

Chemical Formula 1 is as follows:

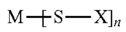

M is a divalent to tetravalent metal,

X is an organic group of 3 to 20 carbon atoms, and n is an integer of 2 to 4.

2. The solventless quantum dot composition of claim 1, wherein the second ligand is represented by Chemical Formula 2, wherein:

Chemical Formula 2 is as follows:

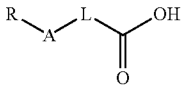

L is a single bond or is selected from the group consisting of a substituted or unsubstituted alkylene of C1 to C20 and a substituted or unsubstituted alkenylene of C1 to C20, A is a single bond or is selected from the group consisting of an alkylene of C1 to C20 and alkenylene of C1 to C20 containing at least one functional group selected from the group consisting of ester (—C(═O)O—), ether (—O—), carbonyl (—C(═O)—), sulfonyl (—$SO_2$—), sulfide (—S—), and sulfoxide (—SO—), and R is a hydrogen atom or is selected from the group consisting of a substituted or unsubstituted alkyl of C1 to C20 and a substituted or unsubstituted alkenyl of C1 to C20.

3. The solventless quantum dot composition of claim 1, wherein M is selected from the group consisting of Mg, Ca, Sc, Ti, V, Cr, Mn, Fe, Co, Ni, Cu, Zn, Ga, Ge, Sr, Mo, Pd, Cd, In, or Sn.

4. The solventless quantum dot composition of claim 1, wherein X in Chemical Formula 1 is an organic group of 4 to 15 carbon atoma containing an ester (—COO—) functional group.

5. The solventless quantum dot composition of claim 1, wherein the second ligand does not contain any thiol group.

6. The solventless quantum dot composition of claim 2, wherein A in Chemical Formula 2 an alkylene or alkenylene of C2 to C15 containing ester (—COO—), ether (—CO—), or a combination thereof.

7. The solventless quantum dot composition of claim 1, wherein the first ligand and the second ligand are mixed at a molar ratio of 1:0.1 to 20.

8. The solventless quantum dot composition of claim 1, wherein the quantum dot and the ligands are mixed at a weight ratio of 1:0.05 to 0.5.

9. The solventless quantum dot composition of claim 1, wherein the quantum dot is contained in an amount of 1 to 60% by weight, based on a total weight of the solventless quantum dot composition.

10. The solventless quantum dot composition of claim 1, wherein the photopolymerizable monomer is a (meth)acrylate-based monomer.

11. The solventless quantum dot composition of claim 1, further comprising a photoinitiator, a light diffuser, a polymerization inhibitor, or a combination thereof.

12. The solventless quantum dot composition of claim 1, being 30 cps or less in viscosity.

13. The solventless quantum dot composition of claim 1, wherein the solventless quantum dot composition is used for ink-jet printing.

14. A cured film, prepared using the solventless quantum dot composition of claim 1.

15. The cured film of claim 14, having a light absorptivity of 75% or greater and a photoconversion efficiency of 25% or greater.

16. A color filter, comprising the solventless quantum dot composition of claim 1.

17. A display device, comprising the color filter of claim 16.

18. A method for preparing a solventless quantum dot composition, the method comprising:

(a) surface modifying quantum dots with a first ligand represented by Chemical Formula 1 and a second ligand of 3 to 40 carbon atoms containing a carboxyl group, wherein:

Chemical Formula 1 is as follows:

$$M-\!\!\left[S-X\right]_n$$

M is a divalent to tetravalent metal,

X is an organic group of 3 to 20 carbon atoms, and n is an integer of 2 to 4;

(b) centrifuging a reaction mixture of step (a) to obtain surface-modified quantum dots; and (c) dispersing the surface-modified quantum dots in a photopolymerizable monomer.

19. The method of claim 18, wherein step (a) comprises one of:

(a-1) introducing a first ligand into the quantum dot dispersion and reacting to modify the surface of the quantum dots, followed by introducing a second ligand and reacting to further modify the surface of the quantum dots; or (a-2) simultaneously introducing the first ligand and the second ligand and reacting to modify the surface of the quantum dots.

20. A method for manufacturing a cured film, the method comprising:

forming a pattern by inkjet spray-coating the solventless quantum dot composition of claim 1 onto a substrate; and curing the pattern.

* * * * *